US008090657B2

(12) United States Patent
Mitchell et al.

(10) Patent No.: US 8,090,657 B2
(45) Date of Patent: Jan. 3, 2012

(54) METHOD AND APPARATUS FOR AUTHENTICATING FINANCIAL TRANSACTIONS

(75) Inventors: Colin Mitchell, Auckland (NZ); Kurt Laurence Scholz, Auckland (NZ)

(73) Assignee: Electronic Finger Print Technologies Limited, Auckland (NZ)

( * ) Notice: Subject to any disclaimer, the term of this patent is extended or adjusted under 35 U.S.C. 154(b) by 2138 days.

(21) Appl. No.: 10/169,501

(22) PCT Filed: Jan. 3, 2001

(86) PCT No.: PCT/NZ01/00001
§ 371 (c)(1),
(2), (4) Date: Jul. 3, 2002

(87) PCT Pub. No.: WO01/50428
PCT Pub. Date: Jul. 12, 2001

(65) Prior Publication Data
US 2003/0149661 A1    Aug. 7, 2003

(30) Foreign Application Priority Data

Jan. 5, 2000 (NZ) ...................................... 502116
Feb. 16, 2000 (NZ) ...................................... 502922
Dec. 11, 2000 (NZ) ...................................... 508781

(51) Int. Cl.
*G06Q 40/00* (2006.01)
(52) U.S. Cl. ......................................................... 705/44
(58) Field of Classification Search ...................... 705/44
See application file for complete search history.

(56) References Cited

U.S. PATENT DOCUMENTS

| 4,947,443 | A | * | 8/1990 | Costello ..................... 382/125 |
| 5,432,329 | A | | 7/1995 | O'Boyle et al. |
| 5,473,144 | A | * | 12/1995 | Mathurin, Jr. ............... 235/380 |
| 5,546,523 | A | | 8/1996 | Gatto |
| 5,585,787 | A | * | 12/1996 | Wallerstein ................ 340/5.42 |
| 5,613,012 | A | | 3/1997 | Hoffman et al. |
| 5,770,843 | A | | 6/1998 | Rose et al. |
| 5,805,719 | A | | 9/1998 | Pare, Jr. et al. |
| 5,838,812 | A | | 11/1998 | Pare, Jr. et al. |

(Continued)

FOREIGN PATENT DOCUMENTS

JP   A 11-338947   12/1999

(Continued)

OTHER PUBLICATIONS

Wen-Her Yang, Shiuh-Pyng Shieh,Computers & Security vol. 18, Issue 8, 1999, pp. 727-733.*

(Continued)

*Primary Examiner* — Alexander Kalinowski
*Assistant Examiner* — Chuks Onyezia
(74) *Attorney, Agent, or Firm* — Young & Thompson

(57) ABSTRACT

A system for authentication of financial transactions using a remote terminal includes apparatus for sampling a unique biological identifier of a system user. The system has particular relevance to credit card or other electronic funds transfer transactions whereby the user may complete a transaction over the Internet, or at a merchant's remote terminal by using a unique biological identifier in place of the credit card. The unique biological identifier is preferably a finger print which is read by a camera at the personal computer or remote terminal. The image is digitized and forwarded to a clearing house to identify the appropriate account for the required transaction to be processed.

20 Claims, 4 Drawing Sheets

FIG. 2

U.S. PATENT DOCUMENTS

| | | | |
|---|---|---|---|
| 5,870,723 A * | 2/1999 | Pare et al. | 705/39 |
| 6,012,039 A | 1/2000 | Hoffman et al. | |
| 6,050,493 A * | 4/2000 | Fertig | 235/487 |
| 6,154,879 A | 11/2000 | Pare, Jr. et al. | |
| 6,192,142 B1 | 2/2001 | Pare, Jr. et al. | |
| 6,230,148 B1 | 5/2001 | Pare, Jr. et al. | |
| 6,289,111 B1 * | 9/2001 | Takhar | 382/115 |

FOREIGN PATENT DOCUMENTS

| | | |
|---|---|---|
| WO | 96/36934 | 11/1996 |
| WO | 98/04996 | 2/1998 |
| WO | 98/15924 | 4/1998 |
| WO | WO 98/15924 | 4/1998 |
| WO | 99/52060 | 10/1999 |

OTHER PUBLICATIONS

C.-C Chang, S.-J. Hwang, Computers & Mathematics with Applications vol. 26, Issue 7, Oct. 1993, pp. 19-27.*

Constantinos Markantonakis, Information Security Lecture Notes in Computer Science, 1998, vol. 1396/1998, 188-197, DOI: 10.1007/BFb0030420.*

Personal Products, Visa Electron, http://international.visa.com/ps/products/electron/main.jsp.

Anonymous No Name Visa Electron Card, New Market Resources, http://www.network54.com/Forum/thread?forumid=27708&messageid=1118608411...

Bank Account—No Bank Reference Required, No Name Visa Card, http://www.talkgold.com/forum/history/topic/23545-1.html.

* cited by examiner

METHOD AND APPARATUS FOR AUTHENTICATING FINANCIAL TRANSACTIONS

FIELD

This invention relates to the authentication of financial transactions using a remote terminal.

BACKGROUND

Typically remote terminals are used in stores to authenticate a credit card transaction at the point of sale, or to authorise a direct debit transaction. In New Zealand and some other countries such terminals are commonly referred to as EFT-POS (standing for "Electronic Funds Transfer Point of Sale" terminal). Other transactions of this type involve the use of automatic teller machines ("ATM") in which the customer can withdraw money, or can arrange to transfer money from one account to another, or to obtain a statement of one or more of the customer's accounts. All of these transaction rely on some form of plastic card containing machine readable information. These cards are commonly called credit cards or debit cards. Depending upon how the cards are used, whether they are a typical "dumb card"or a "smart card" the user is required to authenticate the transaction by signing a document, typically a receipt or credit card form, or by entering a PIN (standing for "Personal Identification Number") which the customer then has to remember and enter into the appropriate terminal at the appropriate time.

The plastic card is partly to identify the customer and the customer's account number. However it is an incomplete identification, requiring either the customer's signature or the entry of a PIN.

The problem with plastic cards of the credit or debit card type, is that such cards can be stolen, or misused. Relying on a customer's signature, and comparing the signature on the document to that on the credit card still allows for fraud, as the unauthorised user of the card may have practised the signature, and in many cases the merchant may not bother to compare the signature on the card or the signature on the receipt. Similarly with a debit card, the thief may have discovered the customer's PIN and may be able to access the account.

There is a need to reduce the risk of fraud associated with the theft or misuse of credit or debit cards, and yet still allow the customer the opportunity to conduct remote financial transactions making use of an ATM, or point of sale terminal when withdrawing money from a bank or shopping.

OBJECT

It is an object of the invention to provide an improved method and apparatus for authenticating financial transactions, or one which will at least provide the public with a useful choice.

STATEMENT OF INVENTION

The solution involves the use of a unique biological identifier, together with an appropriate measuring device at the remote terminal, which allows the user to do away completely with the plastic card if the user so desires. The invention allows the user to rely completely on the unique biological identifier to serve both as the account number and/or the PIN, or allows the user to combine the use of this unique biological identifier with a plastic card and/or separate PIN. The invention will be more readily understood by reading the description of the preferred embodiments. For the moment the invention will be considered in general terms.

Suitable unique biological identifiers of the present time include fingerprints (the most preferred form of unique biological identifier), palm prints, retinal scans, voice prints and DNA measurement. By linking the unique biological identifier, for example a stored fingerprint, with an account number, then by taking a fingerprint at a point of sale terminal and transmitting information about that fingerprint to a financial "clearing house" (bank, credit or debit card company or the like), that unique biological identifier can be identified by the clearing house and then linked to the financial information for that particular customer. By this means a unique biological identifier such as a fingerprint can serve as both the account number and the equivalent of the signature or PIN which would give the customer access to that particular account. Indeed it is possible by using fingerprints to use the prints on different fingers to access different accounts at the same bank, or to access different accounts at other banks or credit card companies. This will become apparent from the description of the preferred embodiment.

In one aspect the invention consists in a computer implemented method of authenticating a financial transaction requested by a user using a remote terminal, the method of including the steps of storing account information in machine readable form, the information relating to one or more financial accounts, storing identity information relating to each account, the identity information including machine readable information corresponding to a unique biological identifier supplied by at least one individual authorised to access at least one of the accounts, submission by the user of the user's unique biological identifier, and submission of the user's transaction request at the remote terminal, transmission from the remote terminal to a clearing house of the user's unique biological identifier and the user's transaction request, a comparison made by the clearing house of the user's unique biological identifier with the stored identity information, if the users unique biological identifier matches any of the stored identity information, then the transaction information is compared with the account to which the biological information relates to ascertain whether the requested transaction is allowable, and if the transaction is allowable, processing the transaction.

In a further aspect the invention consists in apparatus for authenticating a financial transaction requested by a user using a remote terminal, the apparatus including a database having account information in machine readable form, the account information relating to one or more financial accounts the database also storing identity information relating to each account, the identity information including machine readable information corresponding to a unique biological identifier supplied by at least one individual authorised to access at least one of the accounts receiving means to receive information from a remote terminal corresponding to the user's unique biological identifier and information relating to the user's transaction request at the remote terminal, comparing means to compare the users unique biological identifier with the stored identity information to ascertain the relevant account, and processing means to process the requested transaction.

In a further aspect the invention consists in a bank card, such as a credit card, eftpos card or the like, including a series of digits on the card, the digits including information to enable identification of a clearing house relating to an account which the owner of the card in use has authorisation to access, and there being no identification information on the card regarding the identity of the user or the identity of the actual account or accounts which the user is authorised to access.

In another aspect, the invention provides a method of authenticating financial transactions by establishing a clearing house which stores information in machine readable form on a plurality of customers, each customer's information including at least information on the account, including the account balance or credit limit for the account, and information pertaining to an unique biological identifier supplied by the customer, linking the clearing house to one or more remote terminals which remote terminals can be accessed by customers or by merchants, or both, (for example point of sale terminals or ATM machines) means for transmitting from one or more of those terminals information to the clearing house information containing details of the transaction to be approved by the clearing house, and information relating to the unique biological identifier detected or measured by the terminal, the clearing house comparing the received information on the transmitted unique biological identifier with its store of such information, identifying the particular account correlated with the received unique biological identifier and then comparing the details of the financial transaction with the account information and any rules relating to that particular account, to determine whether the transaction should be approved or declined. If the transaction is declined, information on this is transmitted back to the originating terminal, and if the transaction is approved, the appropriate financial transactions are performed, and recorded on the customer's account ledger, in confirmation of the transaction is transmitted to the originating terminal. In either event a statement may be printed at the terminal for the customer, as required.

Preferably the stored information includes the account name, details of the customer, optionally a PIN or password only known to the customer, in the unlikely event that additional verification is required. Typically the account information will be similar to that maintained by a bank, credit card company, or other financial enterprise with full information on the customer and the customer's account. Such information is usually obtained by the customer filling out appropriate forms at the time that the account is created. In this case, the customer would supply the usual information supplied to the bank or credit card company and also supply a unique biological identifier, which in this example is referred to as a finger print. But other unique biological identifiers can be used in this invention, if they can be readily supplied to the financial enterprise when the customer applies for an account of this type, and can be readily measured at a remote terminal, to allow the customer to access this particular type of account.

Because the use of an unique biological identifier to give the customer access to his or her account enables the customer to avoid the use of a physical credit or debit card, or even a PIN, and yet the account is tied to that customer, and is not transferable (unless someone decides to chop off the customer's finger, or to coerce the customer to use a remote terminal by force, drugs or the like), the use of a unique biological identifier opens up the possibility of a customer safely operating an anonymous or numbered account. For example a financial enterprise may open special accounts for customers (subject to the relative taxation laws) whereby a customer deposits a certain amount of money into this unnamed account, and identification is by way of the customer's unique biological identifier. This would allow the customer to withdraw sums of money, or authorise purchases at point of sale terminals without the bank or the operators of the terminals knowing the identity of the customer. This may of course be contrary to the wishes of governments and in particular the appropriate taxation authorities as it would enable persons to carry out anonymous transactions.

In another aspect the invention provides apparatus for authenticating financial transactions including a remote terminal connectable to a clearing house including a key pad to enter a financial transaction, and means for measuring or recognising a unique biological identifier, and means for transmitting information to a clearing house.

Preferably the apparatus includes a card reader and may optionally include a printer to print a record of the transaction.

Preferably the apparatus includes some form of display such as LCD display to show the amount of the transaction, and any message received from the clearing house, for example stating whether the transaction is "approved" of "declined".

Preferably the apparatus includes a standard EFTPOS terminal with appropriate EFTPOS remote to enable information to be keyed into the EFTPOS terminal, but also includes a device for measuring or recognising a unique biological identifier.

Most preferably the device measuring the unique biological identifier is a device for recognising, and codifying a finger print.

Preferably this device is a capacitive imaging device, and means for codifying that finger print information so that it can be readily transmitted to the clearing house in a form acceptable to the clearing house. Preferably the information on the finger print (of other unique biological identifier) is encrypted along with the financial information and transmitted by the remote terminal to the clearing house.

Preferably the transaction takes place over the internet, or some other communications medium, using in this case the customer's personal computer, or a publicly accessible computer such as a kiosk, or someone else's computer set up to allow the user to conduct business over the internet or equivalent communications medium.

Preferably the computer to be used by the customer has imaging means connected to it to enable the computer to capture an image, more preferably a digital image, of the customer's fingerprint. In its most preferred form, the invention makes use of an internet camera (typically a small CCD camera capable of capturing a digital image and transmitting that image to the computer). Alternatively, other imaging means may be used, for example a scanning device may be used to scan the customer's hand or single finger, when placed on the bed of the scanner.

In another aspect, the invention provides a method of authenticating financial transactions by establishing a clearing house which stores information in machine readable form on a plurality of customers, each customer's information including at least information on the customer's account, including the account balance and credit limit for the account, and information pertaining to a unique biological identifier supplied by the customer, linking the clearing house to one or more remote terminals which remote terminals can be accessed by customers or by merchants, or both, (for example point of sale terminals or ATM machines), means for transmitting from one or more of those terminals information to the clearing house, information containing details of the transaction to be approved by the clearing house, information containing details of the account type or clearing house which administers the account, and information relating to the unique biological identifier detected or measured by the terminal, the clearing house comparing the received information on the account type to direct the transaction to the appropriate account for the clearing house, and comparing the received information on the transmitted unique biological identifier with its store of such information, identifying the particular account correlated with the received unique biological identifier, and then comparing the details of the financial transaction with the account information and any rules relating to that particular account, to determine whether the transaction should be approved or declined.

Preferably, if the transaction is declined, information on this is transmitted back to the originating terminal, and if the transaction is approved, the appropriate financial transactions are performed, and recorded on the customer's account ledger, and confirmation of the transaction is transmitted to the originating terminal.

Preferably, whether the transaction is accepted or declined, a statement may be printed at the terminal for the customer, as required.

Preferably the transaction takes place over the Internet, or some other communications medium, using in this case the customer's personal computer, or a publicly accessible computer such as a kiosk, or someone else's computer set up to allow the user to conduct business over the Internet or equivalent communications medium.

Preferably the account information is the information which is carried on a users credit, debit, or EFTPOS or similar card being that information which identifies the particular bank or entity which administers the accounts to which the card relates.

Preferably the card therefore only carries numbers visible on the card which relate to the particular clearing house or bank etc to which the card relates and no other information regarding the users specific account or identity is carried on the card.

Preferably the users identity and account details are accessed by using the unique biological identifier information.

Alternatively, a pin number may also be provided for use by the customer.

DRAWINGS DESCRIPTION

These and other aspects of this invention, which would be considered as novel in all aspects would become apparent from the following description, which is given by way of example only, with reference to the accompanying drawings in which.

PREFERRED EMBODIMENTS

EXAMPLE 1

In this first example a finger print reader is used in conjunction with an electronic funds transfer point of sale terminal. Typically such a terminal will have a card reader to read the magnetic strip on a credit or debit card, and this information on the customer's account will be linked to a keypad, on an EFTPOS remote terminal enabling the customer to enter a PIN if required, and in the case of credit card transaction to push the button marked "credit" so that the information from the card and the customer's PIN (if required) is transmitted to a clearing house. Typically such terminals are connected by a telephone line and modem to a bank or credit card clearing house, and depending upon the size of the country and number of accounts, there may be a number of such clearing houses associated with a particular financial enterprise.

In this example a finger print reader, preferably a capacitive reader (described below) is linked to the EFTPOS terminal of EFTPOS remote. Preferably the reader has controls, enabling the user to select one or more accounts associated with that unique biological identifier. It will be appreciated that some customers may only have a single account, with one company, while some customers may have multiple accounts with multiple companies.

Figure 1:
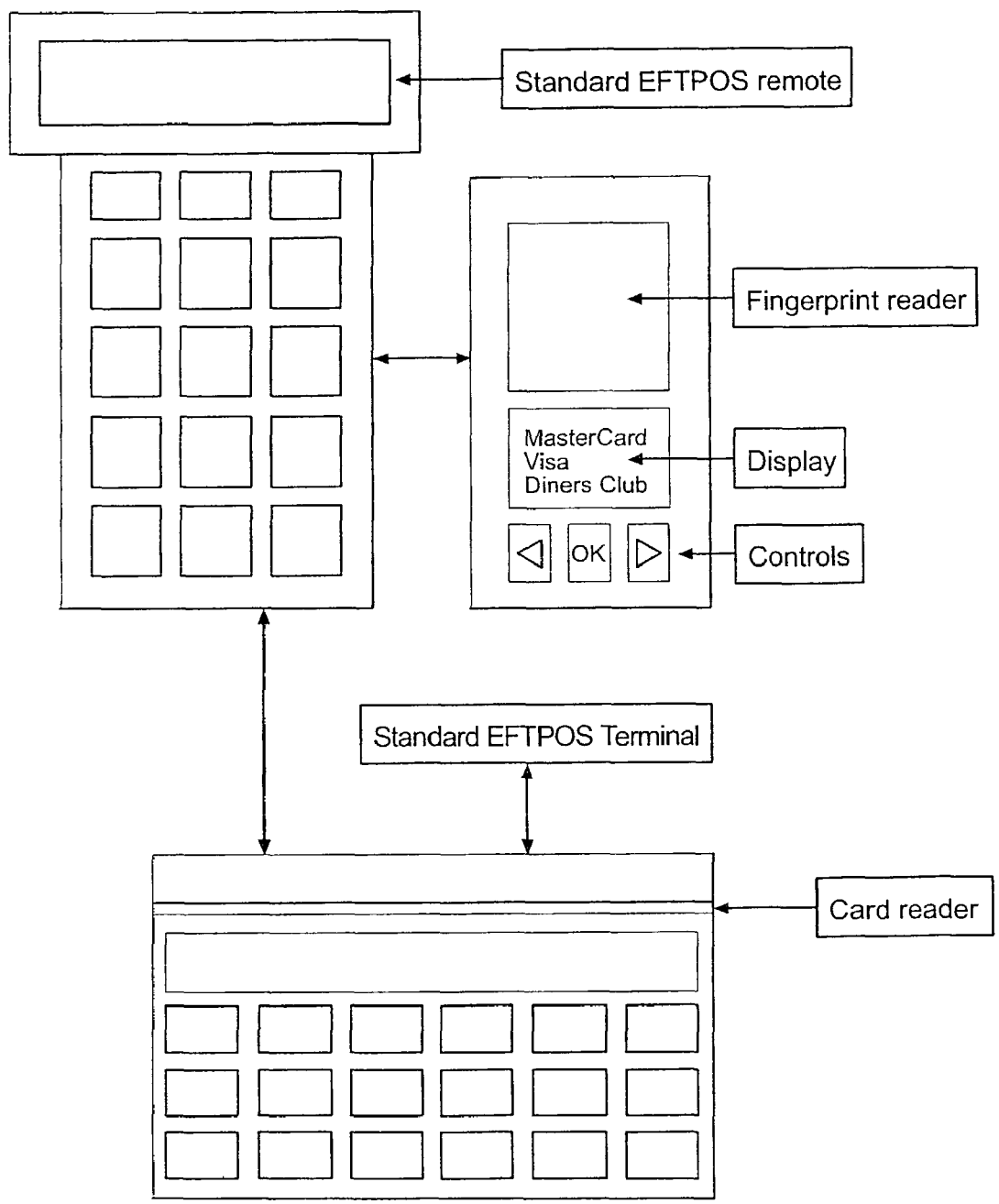
FIG. 1 illustrates the combination of an EFTPOS terminal, EFTPOS remote and finger print reader.

In the example illustrated in FIG. 1, the display enables the customer to choose between the most commonly used credit card or charge card companies approved by that particular merchant. It will be the merchant's choice as to which company the merchant deals with, and hence this information may be pre-set on the merchant's EFTPOS terminal, or maybe scrolled through on a LCD display. At the time the transaction takes place the merchant will enter the amount of the transaction, will ask the customer whether the customer wishes to use a credit or debit card, or use what the inventor believes should be called a "finger print credit card" (although no such physical card is required, it is believed that this term will perhaps be more acceptable to both the merchant and the customer when such accounts are marketed). If the customer chooses to use his or her "finger print credit card" the customer will then be asked to place their finger print on the finger print reader, to nominate which of the available accounts is associated with the customer's finger print, to then press the "OK" button to transmit that information through the EFTPOS terminal to the clearing house.

Figure 2:
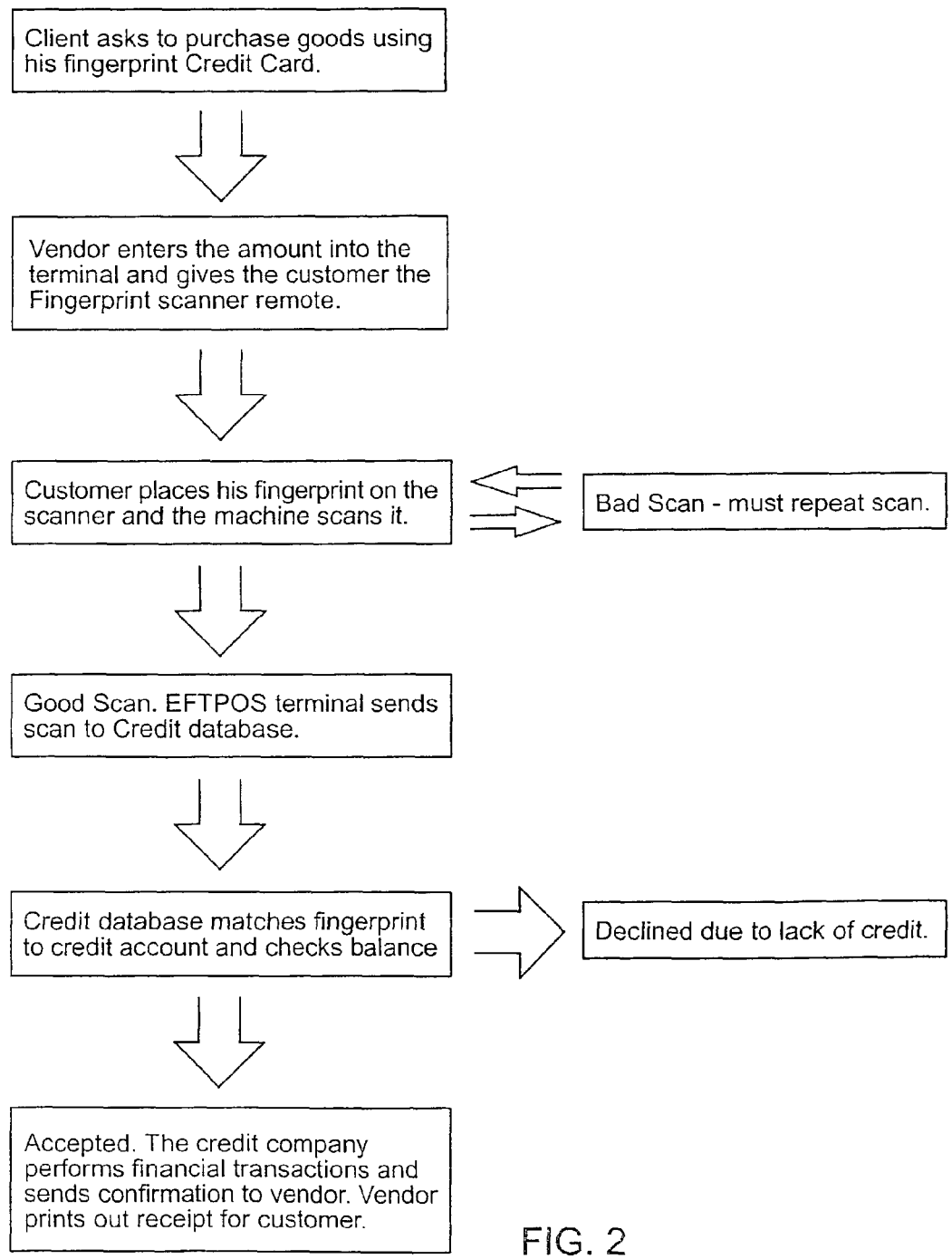
FIG. 2 is a finger print credit card flow chart.
Figure 3:
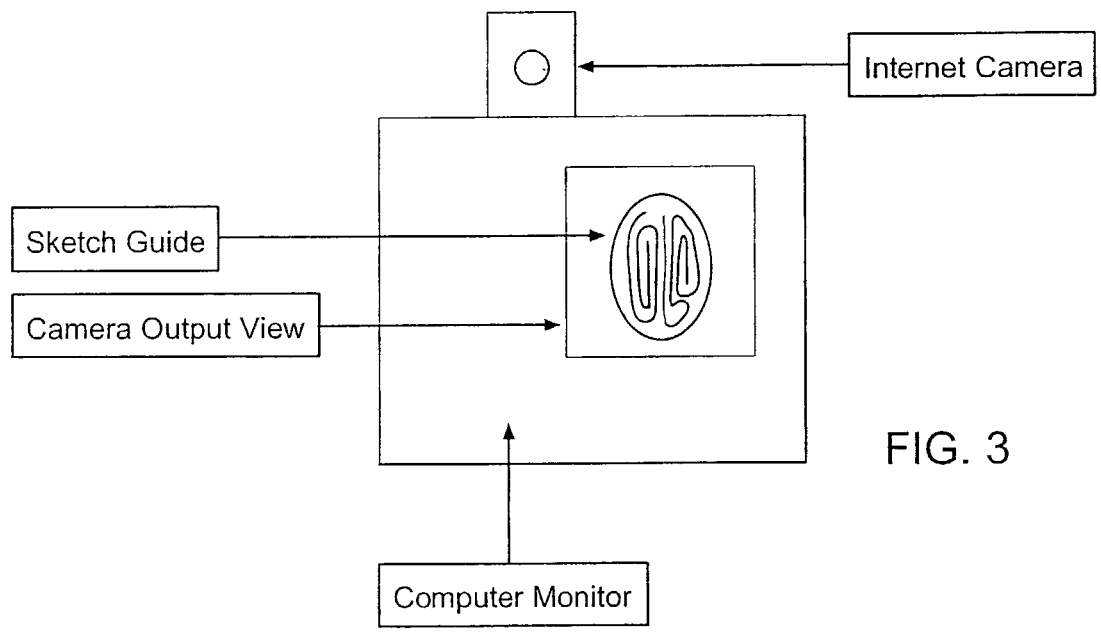
FIG. 3 illustrates the combination of an internet camera, connected to a personal computer, and shows a selected view of the camera output on the computer monitor screen.

Turn now to FIG. 2 to consider the flow chart detailing these transaction. The first few steps deal with the operation of the remote terminal. The customer having chosen to use a "finger print credit card", the finger print must first be identified on the finger print reader. The finger print reader will have the appropriate software to determine whether or not the scan of the finger print is a good scan or a bad scan and must be repeated. Once the device recognises that there is good scan ie a sufficiently clear scan of the finger print, that information is sent via the EFTPOS terminal to the clearing house, in this case a credit data base. As shown in FIG. 1, the customer has chosen the VISA (trade mark) credit card database. The EFTPOS terminal thus dials the appropriate number for the nearest VISA clearing house.

At the VISA clearing house, the transaction is logged, and the finger print which may have been transmitted as an analogue signal, or more likely as a digitised finger print, is then checked against the appropriate finger print data base, and if a match is made the clearing house then recognises the customer's account number (and may also recognise the customer's name as that is stored against the account number). The clearing house then checks the customer's credit balance, and determines whether the transaction will be approved or declined based on the rules in place for that particular customer, or that particular type of merchant transaction. If the transaction is declined due to lack of credit, or otherwise, information is transmitted back to the remote terminal to say that the transaction is "declined". If the transaction is accepted, then the credit card company performs the appropriate financial transaction, logging the nature of the transaction onto the customer's ledger, sending a confirmation of acceptance to the merchant. This allows the merchant to print out a receipt for the customer.

EXAMPLE 2

In this example the customer may wish to access multiple accounts, with the minimum of entry on the key pad. To do this, the customer may have chosen different unique biological identifiers to be associated with different accounts.

In the simplest version the customer may chose different finger prints or thumb prints to be associated with different accounts.

For example, consider the case of a customer who has existing credit cards with MASTERCARD, VISA and DINERS CLUB, who wishes to travel, yet minimise the risk of inconvenience resulting from lost or stolen credit cards. In which case the customer may apply to MASTERCARD to use the finger print from his/her index finger as the unique biological identifier for MASTERCARD transaction. This means that the customer could continue to use the credit card in some circumstances but when travelling, or perhaps out running or walking and wishes to make a transaction without the presence of his or her credit card, the customer can simply use the finger print identification from the customer's first finger to access the customer's MASTERCARD account to allow the transaction.

Similarly, the customer may have chosen the finger print his or her second finger to identify the customer's VISA card account. Similarly the third finger may be used as the identifier for the customer's DINERS CLUB account.

EXAMPLE 3

The customer may still wish to use a PIN to validate certain transactions. Whether or not a PIN is required, it can be stored in association with the data on the account held at the clearing house. Thus the customer and/or the clearing house may determine the level of security on a particular account. In an extreme case the customer may have to supply the credit card, finger print, and also a PIN. In those circumstances, it is envisaged that the customer will first supply the credit card to the merchant, who processes the transaction, and then the clearing house will ask for either or both a finger print and a PIN.

However, the convenience of the concept of a "finger print credit card" allows the user to do away completely with the use of plastic card, and to rely solely on the user's finger print as the unique biological identifier.

EXAMPLE 4

In this example the customer and the financial enterprise or clearing house may have decided that the customer should provide a finger print as an identification for the customer and also provide secondary means of identification in the case of any ambiguity or uncertainty involving that transaction. Such uncertainty may arise because of corruption of information transmitted over the telephone lines, or the possibility (which is extremely remote) but should be allowed for that the scanned information is similar to that of more than one customer. In this unlikely eventuality, the customer may be required to supply a PIN, or may have determined with the clearing house that a second biological identifier may be used, for example a finger print taken from another finger or better still a finger print taken from a finger on the customer's other hand.

A number of other such permutations suggests themselves, once the concept of using of a "finger print credit card" is considered.

EXAMPLE 5

In this example the remote terminal may rely on a retinal scan rather than a finger print reader. Retinal scans are now available, to uniquely identify individuals. In which case the device of FIG. 1 simply requires the replacement of the finger print reader for a retinal scan device, and information can be supplied to the clearing house in a similar way to that outlined in FIG. 2, with a digitised version of the retinal scan being used to replace the digitised finger print scan. It is also possible to take a "voice print" by having an appropriate sound transducer such as a microphone sample the user's voice and transmit the sampled signal to the clearing house for the required comparison with stored voice file information. Similarly, a palm print could be used rather than a finger print.

EXAMPLE 6

In this example it is possible to measure the customer's DNA to send digitised information to the clearing house, based on the DNA, taken from a small body sample, perhaps a skin scraping or sample of hair, and to use this as the unique identifier. Alternatively, a DNA scan may be performed rather than a body sample having to be provided.

At this time this is less practical, than the finger print reader described above, as the equipment to speedily determine the customer's DNA is not yet as mature as that of the finger print technology which will be discussed in more detail below.

EXAMPLE 7

Internet Fingerprint Transactions

In order to use fingerprint financial transactions over the internet, there must be some way of transmitting the fingerprint from the user's computer to the bank's computer or the computer of the clearing house. This requires either a pre-scanned fingerprint to be present on the user's computer or a way to scan the fingerprint "into" the machine.

The easiest way for the fingerprint to be scanned on today's PC's is via an internet camera. Real-time imaging of the fingerprint can be taken, and the computer can interact with the user to achieve an optimal scan. Once the camera has taken the scan it can then transmit it over the internet.

The following is an example of how the process may work:
1. The user decides on a purchase.
2. The user "clicks" on "make payment via fingerprint".
3. The computer activates the camera and brings up a display of the camera's output.
4. The computer overlays a sketch of where the finger should be placed on the image.
5. The computer waits and looks for a finger image to be placed over the sketch.
6. Once the computer detects the finger it takes a picture of the finger.
7. The picture is compressed and sent to the credit company or bank or clearing house.
8. The clearing house, credit company or bank validates the image or asks for another image.

9. If another image is asked for, the computer repeats steps 5, 6 and 7.
10. Once the print has been validated the purchase goes through.

The output picture of the internet camera will be displayed on screen. A sketch of where the finger should be placed for the scan will be overlaid on the output. The user will place his finger in front of the camera moving it around until it is lined up with the sketch. The computer using a general shape recognition program will wait until the fingerprint is in the correct position and then take a photo of it, which it can send over the internet. Further software can be used in order to alter the picture into the required format for fingerprint identification.

Authentication of the fingerprint image may also be provided. The invention allows this to be effected in a number of different ways, including but not limited to;

transmission by the computer of a number or character string such as the serial number of the computer processor, a serial number associated with the operating system or a "caller id" number from the telephone line the personal computer may use for communications access.

Alternatively, a number may need to be provided by the machine or user before a download from the Internet can occur.

Variations

It will be noted that any convenient means of capturing the image and transmitting it to a personal computer can be used. The most convenient means is the internet camera discussed above. These are readily available. An alternative device that could be used is a scanner, as many personal computers are supplied today with a scanner as standard equipment. Another alternative would be to make use of an electronic still camera which captures a visual image, which can then be transferred to the personal computer.

It will be appreciated that any convenient means of electronically capturing an image of the user's fingerprint and transferring it to the personal computer can be used in conjunction with this invention.

EXAMPLE 8

Existing electronic funds transaction networks or arrangements tend to use a remote terminal which communicates with a central database or router usually referred to as an Electronic Transaction Server (ETS) which then directs the transaction to the appropriate clearing house i.e. directs the transaction to the appropriate bank or other entity or organisation that issued the card or other identifying device which is used to facilitate the requested transaction.

Figure 4:
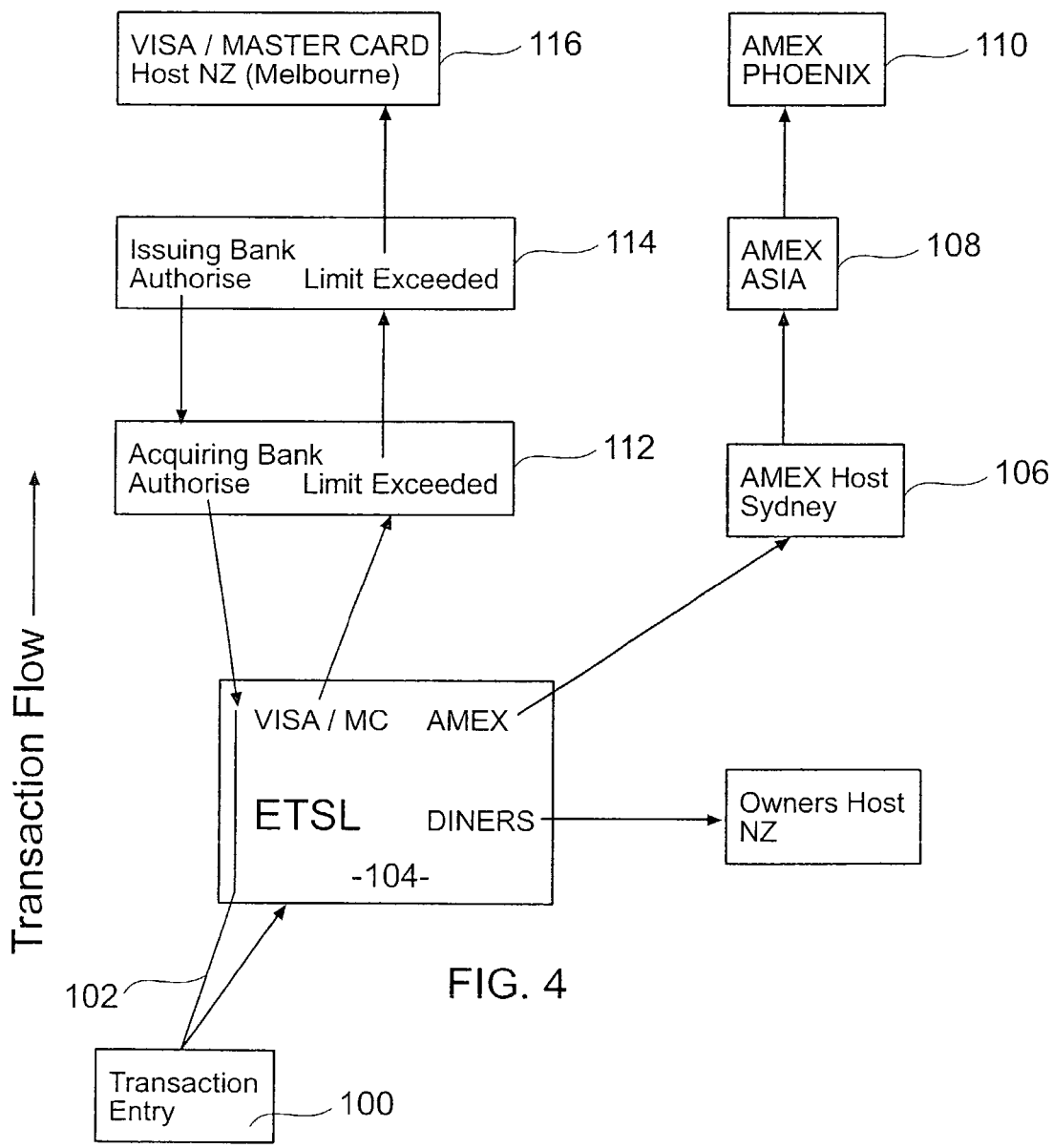
FIG. 4 is a diagrammatic illustration of a typical electronic funds transaction using a credit card at a remote terminal.

Therefore, referring to FIG. 4, a remote terminal 100 is provided and this may be an EFTPOS terminal located at a merchant store or could alternatively comprise a user's personal computer for example. The remote terminal 100, when processing a transaction, will send information from the particular user by some route, for example the Internet or any other communications medium, referenced in FIG. 4 by a link 102 to the ETS 104. In the example described, for the purposes of convenience and ease of illustration, reference will be made to the use of credit cards. However, it will be understood that any other form of electronic transaction processing may be applicable to the invention as described in the example.

Figure 5:
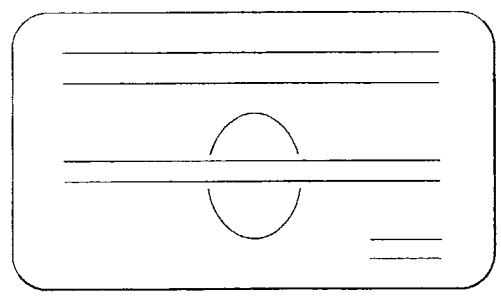
FIG. 5 is a diagram of a credit card or other financial transaction card according to the invention.

The invention envisages that in the example of a credit card, such as that illustrated in FIG. 5, the only information on the card is the name of the entity or bank organisation that issued the card, which in FIG. 5 is AMERICAN EXPRESS for example. Also recorded on the card is the first series of digits which are present on nearly all credit cards, for example comprising four digits which identify the issuing bank or entity, or provide a geographical indication in relation to the issuing entity. Other information which may optionally be provided on the card includes an expiry date.

Turning again to FIG. 4, the use of the card will transmit the numbers on the card (either by a reading device on the terminal such as a magnetic strip reader or apparatus for reading the digits on the card, or by the user or merchant simply entering the digits by keying them into the terminal). This information will be provided to the ETS which will then be able to compare the digits on the card that have been provided by the user with its own stored information so that it may ascertain that the digits 3774 (as shown in FIG. 5) refer to an AMERICAN EXPRESS credit card account and may further alert the ETS that this is a United States based AMERICAN EXPRESS account. Therefore, as shown in FIG. 4, the ETS will know to direct the transaction to the AMERICAN EXPRESS host in Sydney referenced 106 then on through the AMERICAN EXPRESS network through AMERICAN EXPRESS Asia referenced 108 and on to AMERICAN EXPRESS based in Phoenix USA referenced 110. The account information itself is not present on the card and is not provided on the card or by the card when the card is swiped, for example at a remote terminal. Instead, a unique biological identifier is used to identify the actual account details and identify the person (if the clearing house requires this) at the remote terminal who is making the transaction. Such biological identifiers and theft use within financial transactions according to the present invention are described and illustrated in other parts of this document.

Thus, in the example described with reference to FIG. 4, the biological identifier information is provided to the AMERICAN EXPRESS clearing house in Phoenix represented in box 110 and the information is processed to return either an "accepted" or "declined" message through the communications route already described back to the remote terminal. As mentioned previously, the clearing house 110 will process the transaction if it is acceptable and therefore the transaction becomes complete.

The transaction flow may be more complex. Again referring to FIG. 4, if the account happens to be a VISA account for example, then from the information printed on the card, the ETS may direct the transaction firstly to the acquiring bank in box 112 and if this bank indicates that a credit limit is exceeded for example, the transaction may be further forwarded onto an issuing bank for a further check in box 114. Again, if this shows that the limit is exceeded, the transaction may proceed to box 116 which may be another clearing house relating to all VISA cards for example. The issuing bank 114 may instead authorise the payment or transaction in which case an authorisation approval instruction is forwarded back to the acquiring bank in box 112 and then further forwarded on back to the ETS for notification to the customer at the remote terminal.

It will be seen that a very large number of different communication arrangements may be used, but the essence of the invention is that the credit card (if any card at all is used in the transaction) merely carries a number which corresponds to the card issuer or bank or other "clearing house" entity to facilitate direction of the unique biological identifier information to that particular clearing house so that the transaction may be processed.

It will be seen that a very secure financial transaction system, particularly for use over the Internet or other electronic or optical communication mediums is provided, which has the significant advantage that processing speed and implementation with existing financial electronic transaction networks and processors is achieved by using a unique biological identifier.

Discussion

The following discussion concerns finger prints and how they can be used in this invention.

About Fingerprints

In North America, one of the first successful uses of fingerprints for identification was by E. Henry in 1901 to stop the railway workers from double collecting pay.

The Henry system derives from the pattern of ridges; concentrically patterning the hands, toes, feet and in this case, fingers.

The classic method of inking and rolling fingers on a print card produces a pattern unique to each individual digit.

According to the Bundeskriminalamt (BKA); no two individuals have identical ridge patterns, ridge patterns are not inheritable, ridge patterns are formed in the embryo, ridge patterns never change in life, and after death may only change as a result of decomposition. In life, ridge patterns are only changed by accident, injury, burns, disease or other unnatural causes.

Identification from fingerprints requires the differentiation of uninterrupted papillary ridge contours followed by the mapping of anatomic marks or interruptions of the same ridges.

The FBI , list 7 papillary ridge patterns : LOOP, ARCH, WHORL, TENTED ARCH, DOUBLE LOOP, CENTRAL POCKET LOOP and ACCIDENTAL All the above patterns can be discerned by the naked eye and can give a binning or indexing of the resulting databases. The computer can by vector analysis of the change of direction of the ridge lines, achieve what the trained eye naturally sees.

Anatomic characteristics occur because the papillary ridges are not continuous. Each change of direction, bifurcation, interruption or enclosure produces anatomic characteristics (minutia in law enforcement). These characteristics may not be readily available to the human eye but are easily tracked by the computer.

The Result

What this basically means is that a decent fingerprint scanner can identify an individual 100% reliably from his fingerprint. If you link the credit number to the fingerprint instead of a plastic card you have a nearly totally reliable method of credit transactions. It can't be lost or stolen, is always available even if nothing else is, eg after having been mugged or swimming on a beach. In conjunction with a large credit firm, and alongside the normal system, you have a new tool of limitless usefulness.

Fingerprint Technology

Fingerprint imaging technology has been in existence for centuries. The use of fingerprints as a unique human identifier date back to second century B.C. China, where the identity of the sender of an important document could be verified by his fingerprint impression in the wax seal (Ruogles, T. 1996 <http://www.tech.purdue.edu/it/resources/aidc/Bio-WebPages/Biometrics_Reference.html >). During the 17th century, it was known that fingerprints were unique to each individual and therefore could be used to accurately identify an individual. The 19th century introduced systematic approaches to matching fingerprints to certain individuals. One systematic approach, the Henry classification system, based on patterns such as loops and whorls, is still used today to organize fingerprint card files (Authentec, Inc., 1999 <http://www.tech.purdue.edu/it/resources/aidc/Bio-WebPages/Biometrics_Reference.html>). It was developed by a British policeman during the British occupation of India in the 1800's (Ruggles, T. 1996 <http://www.tech.purdue.edu/it/resources/aidc/BioWebPages/Biometrics_Reference.html>). Today, the traditional "inking" of one's fingerprint and pressing it against a paper card is still the standardized way of capturing an individuals fingerprint.

The last several years have proved that fingerprint scanners are overwhelmingly the most successful biometric device (Davis, A. 1997 <http://www.tech.purdue.edu/it/resources/aidc/BioWebPages/Biometrics_Reference.html>). Fingerprint imaging devices/applications account for nearly 80 percent of the total worldwide biometrics market, according to Frost & Sullivan.

The first country to adopt a national computerized form of fingerprint imaging was Australia in 1986, which implemented fingerprint imaging technology into its law enforcement system (Simon, D. G. 1994 <http://www.tech.purdue.edu/it/resources/aidc/BioWebPages/Biometrics_Reference.html>).

It has been estimated that the chance of two people, including twins, having the same fingerprint is less than one-in-a-billion (Industry Information: Biometrics, 1996 <http://www.tech.purdue.edu/it/resources/aidc/BioWebPages/Biometrics_Reference.html>).

Fingerprint imaging technology looks to capture or read the unique pattern of lines on the tip of one's finger. These unique pattern of lines can either be in a loop, whorl, or arch pattern. A loop pattern can be detected when the ridges start on one side of the finger, reach the center of the finger (core-point) and then go or "loop" back to the same side. A whorl pattern can be identified as the concentric circles that are formed by the ridges in the center of one's finger. The remainder of these ridges shape themselves around this whorl pattern. Finally, the arch pattern is where the ridges start at one side of the finger and span themselves across the center of the finger to the other side (Randall, N. 1999 <http://www.tech.purdue.edu/it/resources/aidc/BioWebPages/Biometrics Reference.html>).

There are several methods in accomplishing the process of identifying one's fingerprint. The most common method involves recording and comparing the fingerprint's 'minutiae points'. Minutiae points are the points where print ridges come together or end. Minutiae points can be considered the 'uniqueness' of an individual's fingerprint (Computer Business Review, 1998 <http://www.tech.purdue.edu/it/resources/aidc/BioWebPages/Biometrics_Reference.html>).

Other methods of identifying a person's fingerprint include counting the number of ridges between points, processing the fingerprint image and recording the print's sound waves.

Fingerprint imaging technology is based on two electronic capturing methods: optical and capacitive. Optical fingerprint technologies require the user to place his or her finger on a glass substrate at which point an internal light source from the fingerprint device is projected onto the fingerprint. The image is then captured by a charge-coupled device (CCD). Optical methods have been used extensively and have been in existence for the past decade. They are proven but are on the expensive side and are not always reliable due to environmental conditions. A build up of dirt, grime, and oil from one's finger can leave a "ghost" image which is referred to as a "latent image" (Randall, N. 1999 <http://www.tech.purdue.edu/it/resources/aidc/BioWebPages/BiometricsReference.html>). As a result, their employment has been confined to specific criminal justice and military installations.

On the other hand, capacitive imaging looks to make fingerprint imaging available to the masses by making fingerprint imaging devices (hardware) more compact in size, less expensive, and more reliable. Capacitive systems analyse one's fingerprint by detecting the electrical field around the fingerprint using a sensor chip and an array of circuits.

When a person's fingerprint is initially captured, a 'template' is constructed and stored in a data storage system or database. This 'template' is then used to compare against a person's fingerprint for each subsequent time he or she scans their finger. The fingerprint requires one of the largest data templates in the biometric field. The finger data template can range anywhere from several hundred bytes to over 1,000 bytes depending upon the level of security that is required and the method that is used to scan one's fingerprint.

The identifying power of fingerprint imaging systems seems to show that they tend to reject over three percent of authorized users while maintaining false accept rates of less than one in a million (Industry Information: Biometrics, 1996 <http://www.tech.purdue.edu/it/resources/aidc/Bio-WebPages/Biometrics_Reference.html>).

A Practical Example

As an example let us consider a purchase of a magazine using this system. A person approaches the counter carrying a magazine he wishes to purchase. The store owner types in the amount into the 'EFTPOS' machine. He pulls out a fingerprint scanner and the customer places his finger on it. The scanner sends an image of the print to the credit card company. It matches the fingerprint to it's database, and adds the amount to his card account. It finishes the various financial transactions required and then sends a confirmation message back, perhaps with the customer's name on it. There are also multiple other possibilities. A pin to go with the fingerprint, increasing security and making it easier for the credit company. Multiple fingerprints corresponding to different credit cards. A Card selection menu once a person's fingerprint is scanned. The fingerprint as a bankcard or EFTPOS card.

Conclusions

It will be appreciated that a finger print reader (or possibly other present or future that is if a means for determining the unique biological identifier) could easily replace the card reader used in automated teller machines or in standard EFTPOS terminals, although it is likely that this "finger print credit card" concept will be used along side the magnetically encoded plastic cards for some time to come, and as such it is envisaged that the finger print reader will form part of an automatic teller machine or EFTPOS terminal along side a magnetic card reader.

In the case of automatic teller machines, it is likely that the finger print reader will need to be covered, so that there is only limited finger access to the device, to thereby minimise the possibility of vandalism.

Finally, it will be appreciated that various alterations and modifications may be made to the foregoing without departing from the spirit or scope of this invention.

What is claimed is:

1. A computer implemented method of authenticating a financial transaction requested by a user using a remote terminal, the method comprising:
storing account information in machine readable form at a clearing house, the stored account information relating to one or more financial accounts accessible by at least one individual user,
storing identity information relating to each said financial account at the clearing house, the stored identity information including machine readable information corresponding to a unique biological identifier supplied by at least the one individual user,
submission by the user of a machine readable bank card, credit card, or debit card carrying information that identifies the clearing house storing the individual user's unique biological identifier,
said card i) not visually identifying any particular account associated with the individual user, ii) does not visually identify the individual user's name, iii) does not electronically identify any account associated with the individual user, and iv) and does not electronically identify the individual user's name,
submission by the user of the user's unique biological identifier,
submission, by the user, of a transaction request at the remote terminal, and
transmission from the remote terminal to the clearing house of the user's submitted unique biological identifier and the user's submitted transaction request,
comparing, by the clearing house, of the transmitted user's unique biological identifier with the stored identity information,
wherein if the user's unique biological identifier matches any of the stored identity information, then the transaction information is compared with the stored account information to which the biological information relates to ascertain whether the requested transaction is allowable, and
if the transaction is allowable, processing the transaction.

2. A method as claimed in claim 1, wherein the unique biological identifier comprises a fingerprint and the step of the user submitting the user's unique biological identifier includes the step of the user placing a selected finger on a transducer supplied at the remote terminal and the remote terminal processing the information from the transducer to derive information relating to the unique biological identifier.

3. A method as claimed in claim 1, wherein the step of submission of the user's unique biological identifier is repeated if the stored identity information does not match the user's unique biological identifier.

4. A method as claimed in claim 1, wherein the step of submitting the user's unique biological identifier comprises a step of the user holding a selected finger in front of a camera which records a digital image of the finger print.

5. A method as claimed in claim 4, wherein the remote terminal records the display of the camera's output and overlays a sketch of where the user's finger should be placed on the image, then searches for a finger image to be placed over the sketch, then when the finger is detected, taking a picture of the finger.

6. A method as claimed in claim 5, wherein the picture is compressed and transmitted to the clearing house.

7. A method as claimed in claim 1, wherein said card identifies the clearing house by storing routing information which identifies the clearing house.

8. A method as claimed in claim 7, wherein the routing information is used by a network to which the remote terminal is connected to direct the unique biological and the transaction request information to the appropriate clearing house.

9. Apparatus for authenticating a financial transaction requested by a user using a remote terminal, the apparatus including:
a database having account information in machine readable form, the account information relating to one or more financial accounts,
the database also storing identity information relating to each account, the identity information including machine readable information corresponding to a unique biological identifier supplied by at least one individual authorised to access at least one of the accounts;

receiving means to receive information, from a remote terminal, corresponding to the user's unique biological identifier and information relating to the user's transaction request at the remote terminal;

comparing means to compare the received user's unique biological identifier with the stored identity information to ascertain the relevant account; and processing means to process the requested transaction, wherein the apparatus is configured to associate one or more accounts with the user based on only a match of the user's unique biological identifier alone, without reference to any of the user's account information and the name of the user.

10. The apparatus as claimed in claim 9, including means to compare the requested transaction with rules relating to the account to establish whether the requested transaction can be validly processed.

11. The apparatus as claimed in claim 9, wherein the remote terminal comprises an EFTPOS machine.

12. The apparatus as claimed in claim 9, wherein the remote terminal comprises a personal computer and the apparatus is provided in communication with the internet or another computer network.

13. A computer implemented method of authenticating a financial transaction requested by a user using a remote terminal, the method comprising the steps of:

storing account information in a clearing house, the stored account information being in machine readable form and identifying a financial account and a corresponding account number thereof, the financial account being accessible to an individual user;

storing user biological identity information in the clearing house, the stored biological identity information being in machine readable form and uniquely corresponding to the individual user;

submitting a transaction request for authentication and processing, including the substeps of i) submitting, by the user, a machine readable card, the card identifying the clearing house storing the biological identity information of the user, the card being free of any recording of the account number of the financial account accessible to the user, ii) making a recording of the user's biological identity information at a remote terminal, iii) reading the card submitted by the user to determine the clearing house storing the biological identity information of the user, and iv) transmitting transaction data of the transaction request and the recording of the user's biological identity information, in machine readable form, to the determined clearing house storing the biological identity information of the user; and authenticating and processing the transaction request by i) confirming that the transmitted recording of the user's biological identity information matches the user biological identity information stored in the clearing house, ii) comparing the transmitted transaction data to the stored account information from the clearing house to ascertain whether the requested transaction is allowable, iii) based on the comparison of the transmitted transaction data to the stored account information, making a decision to allow the transaction, and iv) processing the transaction.

14. The method of claim 13, wherein, the machine readable card is one of a bank card, a credit card, and a debit card.

15. A financial transaction system, comprising:

a clearing house for bank cards or credit cards, the clearing house storing information relating to plural customers, the stored information identifying one or more accounts identified for each of the plural customers, each account associated with an identifier unique to the clearing house, each account having an information of a biological identifier unique to one of the plural customers and unique to each account; and a customer card, the customer card having machine readable information comprising the identifier unique to the clearing house; and a transaction initiating terminal located remote from the clearing house, the transaction initiating terminal having a card reader, the transaction initiating terminal configured to i) acquire, via the card reader, the identifier unique to the clearing house from the machine readable information on the customer card, ii) from the acquired identifier unique to the clearing house, identify the clearing house associated with the customer card, iii) acquire a biological identifier as input from the one customer, and iv) transmit the acquired input biological identifier to the identified clearing house, wherein the clearing house, upon receiving the input biological identifier transmitted from the transaction initiating terminal, is configured to i) from all the accounts of the clearing house, identify one of the accounts of the one customer by comparing the received input biological identifier with the information of the biological identifier unique to each account, and, ii) upon identification of the one account by the comparison matching the received input biological identifier with the information of the biological identifier unique to the one account, proceed with authorization of a financial transaction against the identified one account, and wherein the customer card can be used in conjunction with any account of any of the plural customers of the clearing house.

16. The financial transaction system of claim 15, wherein the customer card is free from any recorded information other than clearing house identifying information.

17. The financial transaction system of claim 15, wherein the transaction initiating terminal acquires only the identifier unique to the clearing house from the customer card.

18. The financial transaction system of claim 16, wherein the customer card has machine readable information consisting only of the identifier unique to the clearing house, the customer card being free of any recorded information identifying another clearing house and being free of any other recorded information.

19. The financial transaction system of claim 15, wherein, the clearing house has plural accounts for the one customer, each of the plural accounts for the one customer has information of a different biological identifier of the one customer uniquely associated therewith, and wherein the clearing house, upon receiving the input biological identifier transmitted from the transaction initiating terminal, is configured to i) identify a specific one of the plural accounts of the one customer by comparing the received input biological identifier with the information of the different biological identifier unique to each of the plural accounts of the one customer, and, ii) upon identification of the specific one account by the comparison matching the received input biological identifier with the information of the biological identifier unique to the specific one account, proceed with authorization of a financial transaction against the identified specific one account.

20. The financial transaction system of claim 15, wherein the clearing house identifies the one account of the one customer, uniquely from all the accounts of the clearing house, by comparing only the received input biological identifier with the information of the biological identifier unique to the one account and stored on the clearing house.

* * * * *